United States Patent [19]

Tamune

[11] Patent Number: 4,910,413
[45] Date of Patent: Mar. 20, 1990

[54] IMAGE PICKUP APPARATUS
[75] Inventor: Michihiro Tamune, Tokyo, Japan
[73] Assignee: Canon Kabushiki Kaisha, Tokyo, Japan
[21] Appl. No.: 298,208
[22] Filed: Jan. 17, 1989

Related U.S. Application Data

[63] Continuation of Ser. No. 945,363, Dec. 22, 1986, abandoned.

[30] Foreign Application Priority Data

Dec. 27, 1985 [JP] Japan ................................. 60-297222

[51] Int. Cl.$^4$ ............................................. H01J 40/14
[52] U.S. Cl. ............................... 250/578.1; 250/225; 358/213.28
[58] Field of Search ............................... 250/578, 225; 358/213.27, 213.28, 213.13, 294

[56] References Cited

U.S. PATENT DOCUMENTS 4,383,170  5/1983  Takagi et al. ...................... 250/578
4,584,656  4/1986  Sakai et al. ...................... 358/213.27

Primary Examiner—Edward P. Westin
Assistant Examiner—Khaled Shami
Attorney, Agent, or Firm—Robin, Blecker, Daley & Driscoll

[57] ABSTRACT

An image pickup apparatus comprises an image pickup element, a displacement member for displacing an image incident upon the image pickup element relative to the image pickup element, and a control circuit for controlling the operation of the displacement member in response to the output of the image pickup element.

20 Claims, 3 Drawing Sheets

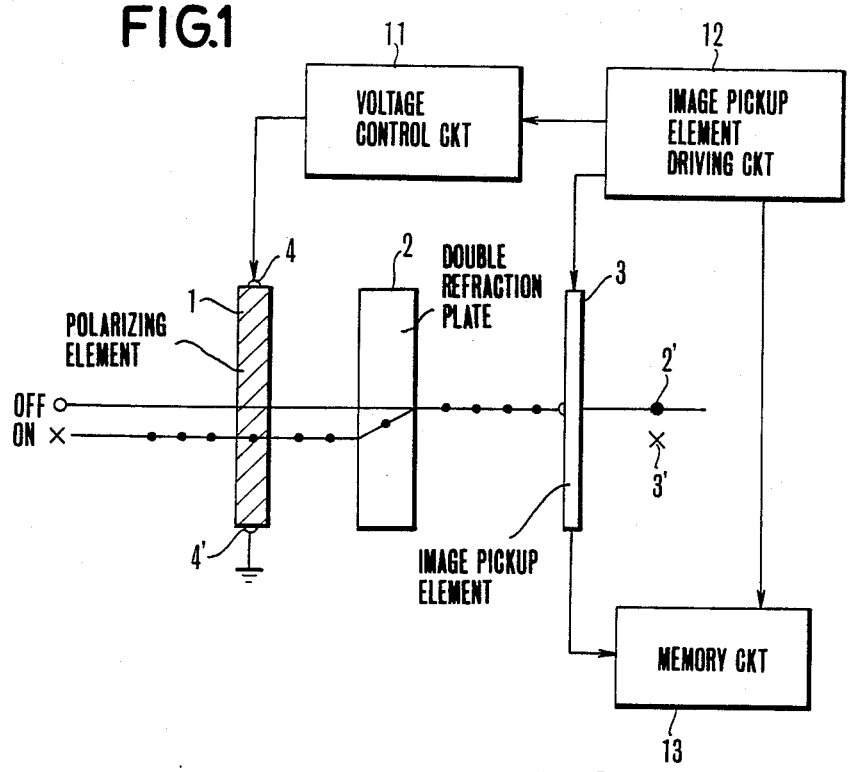
FIG.1
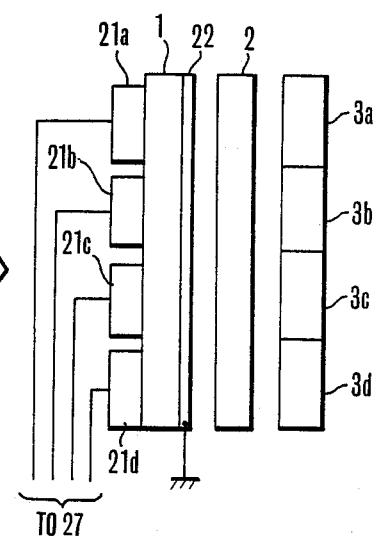
FIG.2
FIG.4

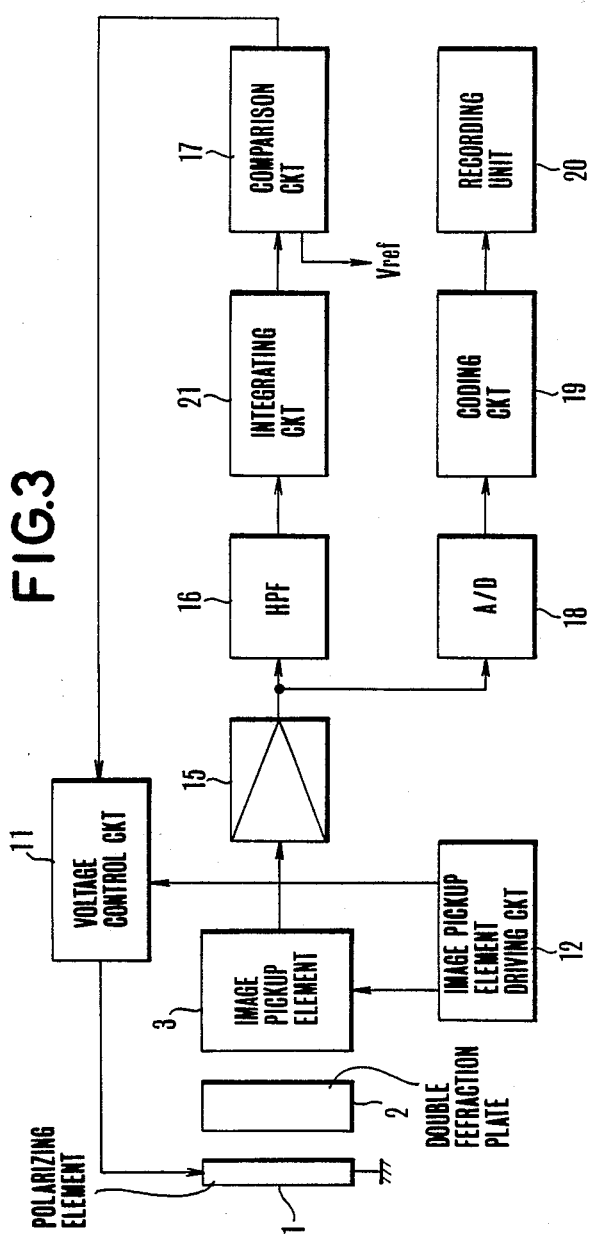

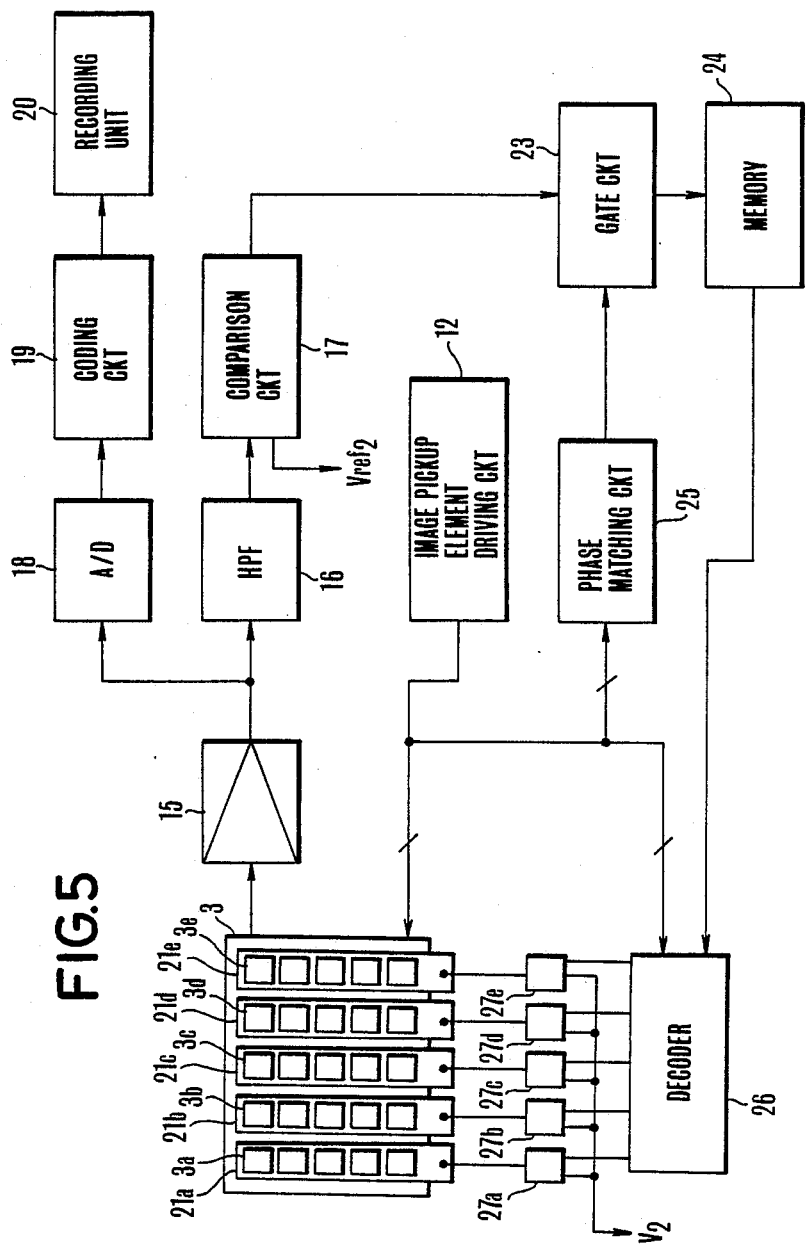

IMAGE PICKUP APPARATUS

This application is a continuation, of application Ser. No. 945,363, filed 12/22/86, now abandoned.

1. Field of the Invention:

The present invention relates to a solid-state high-resolution image pickup apparatus capable of compressing a band for enhancing the resolution of an image pickup element with a limited opening.

2. Description of the Related Art:

Hitherto, systems have been known including one whereby resolution is doubled by vibrating a solid image pickup element by means of a piezoelectric element by the half pitch of a picture element, as disclosed in Japanese Laid-open Patent Application No. Sho 60-18958, and a double image system whereby an image is received by overlapping two rows of picture elements by making use of double refraction, as disclosed in Japanese Laid-open Patent Application No. Sho 59-33978.

In the former case, however, restraints are imposed on a piezoelectric vibration cycle. In the latter case, on the other hand, the number of mechanism elements is large, so that the system as a whole becomes expensive, and a high degree of assembly accuracy in such as positioning is required. Meanwhile, to improve the density of formation of photoelectric converted picture elements so as to allow the solid image pickup element itself to have a high resolution, technical difficulties are involved, and deterioration in characteristics and a substantial increase in cost are entailed.

In addition, with conventional high-resolution image pickup elements, even an object whose spatial frequencies are extremely low as a whole is constantly shot with an extremely high resolution and subjected to a signal processing. Consequently, there has been a drawback in that, even if a band is compressed by a signal processing system, an arrangement of units leading up to the band compression becomes complicated. Furthermore, that has been another drawback in that a lengthy time is required for signal processing.

SUMMARY OF THE INVENTION

Accordingly, it is a primary object of the present invention to provide an image pickup apparatus which is capable of overcoming the aforementioned drawbacks.

It is another object of the present invention to provide an image pickup apparatus which is capable of efficiently effecting band compression with a simple arrangement.

To this end, in accordance with an embodiment of the present invention, an electrooptic element whose polarization characteristics can be controlled in response to a voltage as well as a double refraction means are disposed in front of an image pickup means, and a voltage changeover means for controlling the electrooptic element is provided.

In a state in which a given first voltage is impressed on the polarization means, the incident linearly polarized light is polarized by $\lambda = 90°$. This light is made incident in parallel into the main surface of the double refraction means, and is subjected to deflection as an abnormal beam of light.

Meanwhile, in a state in which a given second voltage is impressed on the polarization means, the linearly polarized light made incident upon the polarization means is not polarized, and is made vertically incident upon the main surface of the double refraction means. The light is then converted to a normal beam of light and advances straight without being deflected.

Accordingly, it becomes possible to displace by a predetermined amount the relative relationship between an image and the image pickup means simply by changing over the voltage applied to the polarization means.

If this amount of displacement is selected such as to become one half of the picture element pitch of the image pickup means, it is possible to double the resolution.

Accordingly, in accordance with the present invention, it is possible to obtain a high-resolution image with an extremely simple arrangement. In addition, since the resolution characteristics are controlled in response to the characteristics of an object, it is possible to form an appropriate amount of information, so that band compression of information becomes possible. Therefore, an arrangement of a transmission system from an image pickup unit to a digital processing system can be simplified.

The above and other objects and features of the invention will become apparent from the following detailed description of embodiments thereof taken in conjunction with the accompanying drawings.

BRIEF DESCRIPTION OF THE DRAWINGS

FIG. 1 is a schematic diagram of an image pickup unit suitable for the present invention;

FIG. 2 illustrates a positional relationship between sample picture elements and light receiving elements of FIG. 1;

FIG. 3 illustrates a first embodiment of an image pickup apparatus employing the image pickup unit of FIG. 1;

FIG. 4 is a schematic diagram of an image pickup unit of a second embodiment of the invention; and FIG. 5 is a second embodiment of the image pickup apparatus.

DETAILED DESCRIPTION OF THE PREFERRED EMBODIMENTS

FIG. 1 shows a first embodiment of the present invention, in which a first polarizing element 1 is constituted by a Pockels cell made of a crystal material such as KDP ($KH_2PO_4$), ADP($NH_4H_2PO_4$), $LiNbO_3$, or the like, or a Schiff base material having a TN effect of a liquid crystal. Electrodes 4, 4' are adhered to the polarizing element 1 by means of a conductive adhesive material or the like. A double refraction plate 2 serves as a double refraction means constituted by a double refraction material such as calcite, a Wollaston prism, or a Savart plate.

This double refraction plate 2 is cut along the plane of a certain crystallographic axis, and its plane of incidence is polished. An image pickup element 3 is constituted by a MOS image sensor, a CCD image sensor, an amorphous silicon sensor, or the like and includes a plurality of light receiving elements. Reference numeral 11 denotes a voltage control circuit as a voltage changeover means for changing over an applied voltage in synchronization with the drive timing of the image pickup element 3 with respect to the polarizing element 1; 12, an image pickup element driving element; and 13, a memory circuit. FIG. 2 shows a positional relationship between sample picture elements and light receiving elements, and reference numeral 3' denotes the position of a row of picture elements of an object whose image is formed at a row 2' of the light receiving elements when a first voltage is applied to the polarizing element 1 between electrodes 4–4'. When a second voltage is applied to the polarizing element 1, the light from sample picture elements is made incident upon the light receiving elements without being polarized.

In other words, when the first voltage $V_1$ (half-wave voltage) is applied to the polarizing element 1, the incident light of the linearly polarized light rotates 90°. This light is made incident in parallel with the main surface of the double refraction plate 2 and is subjected to deflection by approximately 5° 90' as an abnormal beam of light. For instance, if the first voltage (e.g., 2 kV) is applied to rotate a 100 mm Pockels effect element, it is possible to shift the image-forming position by approximately 20 μm if a 0.2 mm-thick double refraction plate is used.

Meanwhile, if the voltage applied to the polarizing element 1 set to a 0 volt ($V_2$ of the second voltage), polarization does not occur in the polarizing element 1, and the beam of light is made vertically incident upon the main surface of the double refraction plate 2 and advances straight in the form of a normal beam of light without being polarized.

In consequence, it is possible to digitally interpolate the image pickup element 3 by switching the applied voltage, with the result that the conventional resolution can be doubled.

Thus, in accordance with the present embodiment, it is easy to effect synchronization because of digital deflection in comparison with a conventional system in which picture elements are scanned on an image pickup element by analog deflection, and the rising of input signals can be effected to allow a clear image to be obtained. In addition, polarizing material can be obtained readily at low cost (the thickness of a liquid crystal, in particular, may be only 1 mm), and the applied voltage may be small (several volts), so that the image pickup apparatus is suitable for assembly in another apparatus and installation in other equipment.

In addition, if a half-wave polarizing element having a Pockels effect ($LiNbO_3$ and PLZT) is used, a half-wave voltage (an applied voltage which rotates the linearly deflecting direction 90°) may be only 2–3 kV in the case of a 10 mm-thick polarizing element. Furthermore, thickness of the double refraction plate can be made small in the vicinity of 0.2 mm in order to effect deflection at 5° 90'. Accordingly, by making an overall arrangement in which the two elements are overlapped, it is possible to readily fabricate a thin image pickup apparatus at low cost using a low voltage and a small current and employing easily available materials.

FIG. 3 shows an example of the arrangement of the first embodiment employing such an electrooptic element. In the drawing, the same elements as those shown in FIGS. 1 and 2 are designated by the same reference numerals.

The image pickup element 3 is driven at a television cycle by means of the drive circuit 12, and the high-band components of its output, after being amplified by means of a pre-amplifier 15, are extracted by a high-pass filter 16. These high-band components are integrated by one picture portion by an integrating circuit 21, and are then compared with a predetermined reference level Vref by a comparison circuit 17, which outputs a high-level signal if an integral amount of high-band components exceeding this level Vref is obtained. If this high level signal is obtained, voltages $V_1$, $V_2$ are applied alternately to the polarizing element 1 per field in synchronization with a vertical synchronizing signal from the image pickup element driving circuit 12. On the other hand, if the integral amount of the high-band components for one picture portion (one vertical period) fails to reach the level Vref, the level of the output of the comparison circuit 17 becomes low, and the voltage V2 is applied constantly to the polarizing element 1. Incidentally, in the present embodiment, the offsetting direction of an image at the time when the voltages $V_1$, $V_2$ are respectively applied to the polarizing element 1 is set in advance such as to correspond to the horizontal scanning direction of a television set. The output from the image pickup element 3 is also input via the pre-amplifier 15 to an A/D converter 18, where the signals are digitalized. Subsequently, after the signals are coded by a coding circuit 19 into a form suitable for recording, the signals are recorded by a recording unit 20 in different areas per field.

Because of such an arrangement, the output of the integrating circuit 21 does not exceed the level Vref with respect to an ordinary image, and video signals recorded per field are shot constantly at the same sampling position with respect to an object. However, if an object having extremely high spatial frequencies is being shot, the sampling position is changed over per field. Accordingly, if this recorded video signal is reproduced as it is by a receiver, the image is interpolated on the picture of the receiver in the horizontal scanning direction, thereby making it possible to obtain a high-resolution image in which the horizontal resolution is substantially doubled.

In addition, a sufficient horizontal resolution can be obtained with respect to an ordinary image in which high-band frequency components are not particularly numerous. Moreover, it is not necessary to employ an A/D converter having a special resolution and operating speed, so that it is possible to obtain a video signal of an optimum resolution with a simple arrangement.

On the other hand, an arrangement may be made such that the polarizing element 1 is operated to effect a polarization changeover per field with respect to an ordinary object, and polarization is not changed over per field with respect to object whose high-band components are extremely few.

FIG. 4 shows an example of an arrangement of a second embodiment of the present invention. In this embodiment, the sampling position per picture element of the image pickup element is changed in response to the object. Specifically, FIG. 4 is a cross-sectional view of the image pickup element and its periphery in the horizontal scanning direction. In the drawing, reference numerals 3a, 3b, 3c, and 3d denote picture elements in the horizontal scanning direction, while reference numerals 21a to 21d, 22 denote transparent electrodes such as polysilicon disposed on the surface of the polarizing element, the electrode 22 being connected to, for instance, 0 V. Furthermore, the electrodes 21a to 21d correspond to the widths of the picture elements 3a to 3d in the horizontal scanning direction, respectively, and have striped configurations in the vertical direction of the image pickup element, as shown in FIG. 5 described below.

FIG. 5 shows an example of the arrangement of the image pickup apparatus employing the arrangement of such an image pickup element, in which the same components as those shown in FIGS. 1 to 4 are designated by the same reference numerals.

The output of a high-pass filter 16, unlike the arrangement shown in FIG. 3, is, without the intermediary of the integration circuit, input to the comparison circuit 17, where comparison with the reference level Vref 2 is made. Consequently, the output level of the comparison circuit 17 becomes high only when the high-frequency components in the signals exceed the level Vref 2 while each horizontal scanning signal is being read. A phase matching circuit 25 compensates for a phase shift caused between a read pulse of each picture element obtained by the image pickup element driving circuit 12 and the high-pass filter 16. An AND circuit for a pulse signal via this circuit 25 and the output of the comparison circuit 17 is constituted by a gate circuit 23 so that a high-level signal can be formed at the positions of picture elements with numerous high-frequency components. This high-level signal is stored in, for instance, a field memory 24.

In consequence, while one picture is being scanned, high- or low-level signals are stored in the field memory 24 in correspondence with the presence of absence of high-frequency components at each picture element.

A decoder 26 outputs pulse signals for controlling switching circuits 27a to 27e so that the voltages $V_1$, $V_2$ are applied alternately per field to the polarizing element placed in front of picture elements corresponding to high-band components in response to the content stored in the memory 24. The switching circuits 27a to 27e apply the voltage $V_2$ to each of the electrodes 21a to 21e in response to the output of the decoder 26.

The voltage $V_1$ is normally applied to each of the electrodes 21a to 21e. In this state, the image pickup element 3 is driven in a television cycle, and each field signal, after being digitalized by the A/D converter 18, is coded by the coding circuit 19, and is stored in different areas of the recording circuit 20 per field.

On the other hand, the high-band components in the signals amplified via the pre-amplifier 15 are compared with the level Vref by the comparison circuit 17. If the high-band components exceed the level Vref, information corresponding to the positions of these picture elements is stored in the memory 24, and the polarizing element 1 placed in front of the picture elements is selectively changed in the next field.

Accordingly, the image of the object is offset in the horizontal direction by the portion of a half picture element only with respect to picture elements having numerous high-band components. Video signals thus accumulated are read during the next field period and are recorded in corresponding areas in the recording unit.

In this case, it goes without saying that the positions of picture elements having numerous high-band components are newly being effected simultaneously.

It should be noted that the image offsetting control based on the results of the above-described detection is delayed by two fields, but this delay is negligible in view of the fact that the correlation between the fields of the image is high. In addition, if the decoder 26 is arranged such that it changes control signals per field if the information concerning on a specific picture element stored in the memory 24 is 1, and, after a predetermined period is elapsed after becoming 0 from 1, the voltage $V_1$ is constantly applied to the electrodes placed in front of the corresponding picture elements, it is possible to obtain a high-resolution image in the same manner as that of the first embodiment, since, if the recorded visual signals are reproduced by a receiver or the like, high-frequency components can be interpolated visually per field in the horizontal scanning direction.

What is claimed is:

1. An image pickup apparatus comprising:
    (a) photoelectric conversion means for converting an optical image incident thereon into an output electric signal;
    (b) displacement means for displacing such incident optical image relative to said photoelectric conversion means; and
    (c) control means for controlling the operation of said displacement means in response to said output signal of said photoelectric conversion means.

2. An image pickup apparatus according to claim 1, wherein said photoelectric conversion means includes an area image sensor.

3. An image pickup apparatus according to claim 1, wherein said displacement means includes an optical system for effecting such displacement.

4. An image pickup apparatus according to claim 3, wherein said optical system includes a polarizing element having polarization characteristics changeable in response to electrical input thereto and further comprising a double refraction plate.

5. An image pickup apparatus according to claim 1, wherein said control means includes means for detecting high-frequency components of said output signal of said photoelectric conversion means, such detecting means generating an output signal indicative of the magnitude of said high frequency components.

6. An image pickup apparatus according to claim 5, wherein said control means renders said displacement means operative selectively in accordance with said output signal of said detection means.

7. An image pickup apparatus according to claim 1, wherein said photoelectric conversion means includes a light receiving surface, said displacement means being operative for displacing such incident image over a plurality of areas of said light receiving surface.

8. An image pickup apparatus according to claim 7, wherein displacement means is operative in a horizontal displacement direction and wherein said plurality of areas are respectively disposed on said light receiving surface in the vertical direction.

9. An image pickup apparatus comprising:
    (a) image pickup means for converting an optical image into an electric signal, said image pickup means including a plurality of picture elements arranged in rows and columns;
    (b) a plurality of displacement means arranged correspondingly with said picture elements in the direction of said rows and adapted to respectively displace said optical image relative to said picture elements; and
    (c) control means for controlling the operation of said plurality of displacement means in response to said electric signal of said image pickup means.

10. An image pickup apparatus according to claim 9, wherein said displacement means is further arranged corresponding with said picture elements in the direction of said columns.

11. An apparatus according to claim 1, wherein said displacement means further includes driving means for periodically operating said displacement means.

12. An apparatus according to claim 1, wherein said control means is arranged to stop the operation of said driving means in response to said electric signal of said image pickup means.

13. An apparatus according to claim 9, wherein each of said plurality of displacement means includes an optical system for effecting such displacement.

14. An apparatus according to claim 13, wherein said optical system includes polarizing means having variable polarization characteristics and a double refraction plate.

15. An apparatus according to claim 9, wherein said control means includes means for detecting a high frequency component of said electric signal, said detecting means generating an output corresponding to the magnitude of said high frequency component.

16. An apparatus according to claim 15, wherein said control means renders said displacement means operative selectively in accordance with said output of said detection means.

17. An image pickup apparatus comprising:
   (a) photoelectric conversion means for converting an optical image incident thereon into an output electric signal;
   (b) displacement means for displacing such incident optical image relative to said photoelectric conversion means; and
   (c) control means for selectively stopping the operation of said displacement means in response to said output signal of said photoelectric conversion means.

18. An apparatus according to claim 17, wherein said control means is arranged to compare a condition in said output signal of said photoelectric conversion means with a reference condition and to selectively stop the operation of said displacement means in accordance with the result of the comparison.

19. An apparatus according to claim 18, wherein said condition in said output signal of said photoelectric conversion means is a magnitude of a predetermined frequency component which is less than the magnitude of said reference condition.

20. An apparatus according to claim 18, wherein said condition in said output signal of said photoelectric conversion means is a magnitude of a predetermined frequency component which is a high band component.

* * * * *